United States Patent
Draghi et al.

(10) Patent No.: US 6,171,711 B1
(45) Date of Patent: Jan. 9, 2001

(54) APERTURED ARTICLE PRECONDITIONED FOR RECOATING

(75) Inventors: Peter J. Draghi, Simsbury; Brian J. Shurman, Plantsville; Dale A. Simard, Terryville; Peter Wrabel, Windsor Locks, all of CT (US)

(73) Assignee: United Technologies Corporation, Hartford, CT (US)

( * ) Notice: Under 35 U.S.C. 154(b), the term of this patent shall be extended for 0 days.

(21) Appl. No.: 09/412,694

(22) Filed: Oct. 5, 1999

Related U.S. Application Data

(62) Division of application No. 08/887,506, filed on Jul. 2, 1997, now Pat. No. 6,042,879.

(51) Int. Cl.⁷ ............................... C23C 10/60; C23C 4/02
(52) U.S. Cl. ................................. 428/596; 428/652
(58) Field of Search .................... 428/596, 577, 428/579, 586, 599, 678, 652, 941

(56) References Cited

U.S. PATENT DOCUMENTS

| | | | |
|---|---|---|---|
| 3,927,952 | * 12/1975 | Kirby | 416/95 |
| 4,121,894 | * 10/1978 | Cretella et al. | 416/213 R |
| 4,141,127 | * 2/1979 | Cretella et al. | 29/156.8 B |
| 4,402,992 | * 9/1983 | Liebert | 427/34 |
| 4,768,700 | * 9/1988 | Chen | 228/159 |
| 4,953,777 | * 9/1990 | Griffith et al. | 228/119 |
| 5,685,971 | * 11/1997 | Schroder et al. | 205/642 |
| 5,702,288 | * 12/1997 | Liebke et al. | 451/36 |
| 5,728,227 | * 3/1998 | Reverman | 134/2 |
| 5,813,118 | * 12/1975 | Roedl et al. | 29/889.1 |

* cited by examiner

Primary Examiner—John J. Zimmerman
(74) Attorney, Agent, or Firm—Kenneth C. Baran

(57) ABSTRACT

A method for preparing a protectively coated, apertured article to be recoated reduces the likelihood that the apertures will become constricted as a consequence of subsequent recoating. The invention, described in the context of a gas turbine engine blade (12) having transpiration cooling passages (34), includes the step of diffusing an auxiliary coating (52) into an existing coating (28) and into the exposed substrate material (26) at the periphery of the passages to form a diffusion zone (54). The blade is then subjected to a stripping agent so that the diffusion zone (54) any undiffused existing coating, and any undiffused auxiliary coating are removed. The method causes a compensatory enlargement of the mouth (44) of each passage so that excess coating that accumulates in the passage mouths during subsequent recoating does not restrict the flow capacity of the passages.

3 Claims, 4 Drawing Sheets

APERTURED ARTICLE PRECONDITIONED FOR RECOATING

This is a division of application Ser. No. 08/887,506, filed on Jul. 2, 1997 now U.S. Pat. No. 6,042,879.

TECHNICAL FIELD

This invention pertains to methods for preparing a protectively coated, apertured article to be recoated with a nonoriginal layer of protective coating. In particular, the invention is a method for preconditioning a transpiration cooled gas turbine engine component, such as a turbine blade or vane, so that the flow capacity of the transpiration cooling passages is not degraded by subsequent recoating of the component.

BACKGROUND OF THE INVENTION

The blades used in the turbine section of a gas turbine engine are susceptible to oxidation, corrosion and thermally induced damage from hot combustion gases flowing through the engine's gaspath. Turbine blades are therefore made from a temperature tolerant, corrosion resistant substrate material to which various protective coatings are applied. In addition, turbine blades usually include numerous transpiration cooling passages, each of which extends from an internal cavity to a gaspath exposed surface of the blade. Each passage has a throat in the vicinity of the cavity and a mouth that extends outwardly from the throat to the exposed surface. During engine operation a cooling medium is supplied to the internal cavity, and at least a portion of the medium flows through the cooling passages to transpiration cool the blade. As the medium discharges from the passages, it disperses over the blade surface to form a cooling film that further shields the blade from thermal distress.

Because turbine blades are expensive, a variety of refurbishment techniques have been developed to restore deteriorated or damaged blades to serviceable condition. The specific details of the various refurbishment techniques depend on the nature and extent of blade damage and deterioration. However certain procedures are almost invariably carried out during refurbishment. For example, it is customary to relieve any residual blade stresses by heating the blades to an elevated temperature for a predetermined period of time. In addition, existing protective coatings are usually removed from the blades, and nonoriginal replacement coatings are applied prior to returning the blades to service.

When a nonoriginal coating is applied to a blade having transpiration cooling passages, excess coating can accumulate in the mouth of each passage. This phenomenon is known as "coatdown" and restricts the flow capacity of the affected passages. Unless coatdown is prevented, or its flow restricting effect is reversed, the effectiveness of the transpiration cooling and film cooling will be diminished, and the blade's useful life will be reduced.

One way to prevent coatdown is to coat the blade by vapor deposition, a coating process that causes little or no coatdown. However the equipment for applying coatings by vapor deposition is expensive, and therefore it is economically unattractive to use the vapor deposition equipment to apply coatings that can be applied by more cost effective means.

One way to reverse the effects of coatdown is to erode the excess coating by propelling a high velocity, precisely focused stream of abrasive particles into the mouth of each affected passage. However the erosive treatment can be inaccurate and nonrepeatable. Therefore the effectiveness of the treatment must be assessed by verifying that a gauge pin, representative of the minimum acceptable passage dimension, is insertable into each passage. Although the erosive process is effective in restoring the flow capacity of a passage, it is also tedious and time consuming since a typical turbine blade has nearly two hundred passages, each of which must be treated and gauged individually. Moreover, the gauge pins are necessarily fragile due to the small diameters of the passages (typically on the order of 0.3 millimeters or about 0.012 inches) and occasionally break, leaving a pin fragment lodged in the passage. Extraordinary measures, such as electro-discharge machining, must often be employed to clear the fragment from the passage.

Thus, it is seen that existing methods for avoiding or reversing the effects of coatdown are unsatisfactory. Accordingly, a time efficient, cost effective and trouble free method of accommodating the coatdown phenomenon is sought.

SUMMARY OF THE INVENTION

It is a primary object of the invention to reverse the effects of coatdown and to do so in a way that is time efficient and cost effective.

According to the invention, an auxiliary coating is diffused into an existing coating on a transpiration cooled article, and into the substrate material exposed at the periphery of the transpiration cooling passages to form a diffusion zone. The mouth of each passage is enlarged when the article is subsequently subjected to a stripping agent capable of attacking the diffusion zone. The enlargement of the passage mouths compensates for the coatdown expected to occur when a nonoriginal layer of coating is deposited on the article.

Ideally the chosen stripping agent is one that is effective against not only the diffusion zone, but also against the auxiliary coating and the existing coating. Therefore, the compensatory enlargement of the passage mouths occurs concurrently with the stripping of the existing coating. The delay and expense associated with applying the auxiliary coating are negligible, especially in comparison to the time and cost required to abrasively erode excess coating from a multitude of passages. The diffusion of the auxiliary coating is similarly benign in terms of its cost and processing time since the diffusion can be carried out while the article is being stress relieved.

According to one aspect of the invention, the auxiliary coating is formed from a commercially available, adherable coating tape that is easily applied to the article.

In one detailed embodiment, the substrate is a nickel base alloy, the existing coating is a member of the class of MCrAlY coatings, and the auxiliary coating comprises aluminum and is diffusible into both the substrate and into the existing coating.

The method of the invention is advantageous in that the required processing steps are carried out largely in parallel with the stripping and stress relieving procedures customarily accomplished during refurbishment of a transpiration cooled article. Accordingly, the disclosed method contributes only negligibly to the expense and time required for article refurbishment, but dispenses with the significantly expensive and time consuming process of abrasively eroding excess coating from the mouths of the cooling passages. Moreover, the disclosed method is repeatable and predictable so that the effectiveness of the method can be verified with a simple aggregate flow capacity test of the article, rather than with a tedious, trouble prone pin check of each individual passage. Finally, it has been observed that the edges of the passage outlets are smoother and somewhat wider than is typical of either abrasively eroded passages or newly installed passages. As a result, the refurbished article may benefit from improved dispersion of the cooling film.

The foregoing features and advantages and the method of the invention will become more apparent in light of the following description of the best mode for carrying out the invention and the accompanying drawings.

BEST MODE FOR CARRYING OUT THE INVENTION

Figure 1:
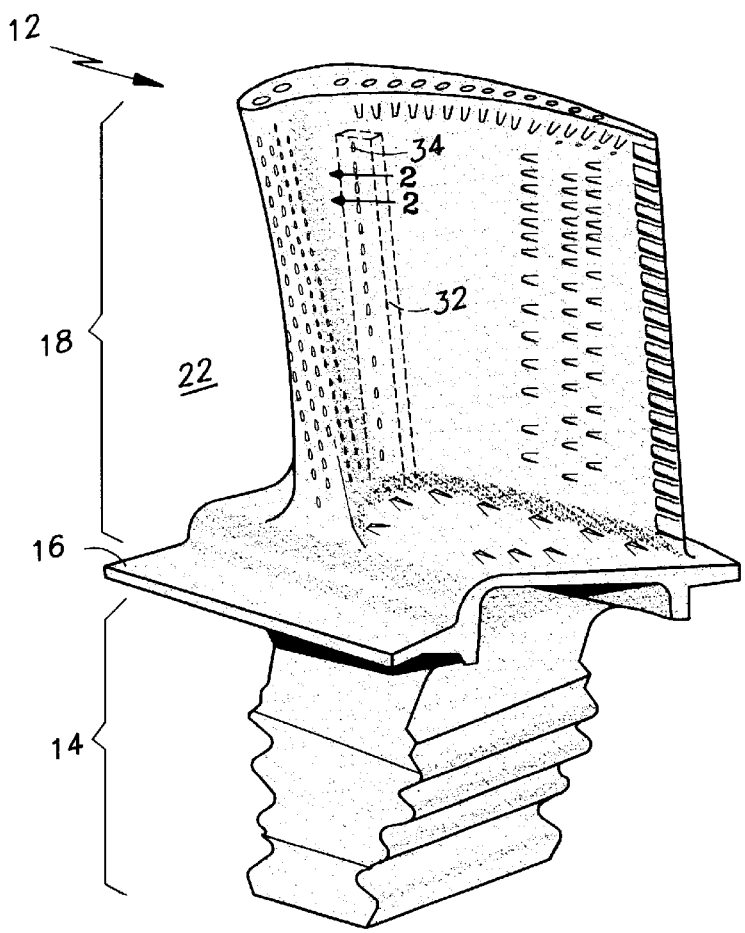
FIG. 1 is a perspective view of an original, newly manufactured turbine airfoil for a gas turbine engine showing a plurality of transpiration cooling passages and a representative internal cavity in flow communication with one row of passages.
Figure 2:
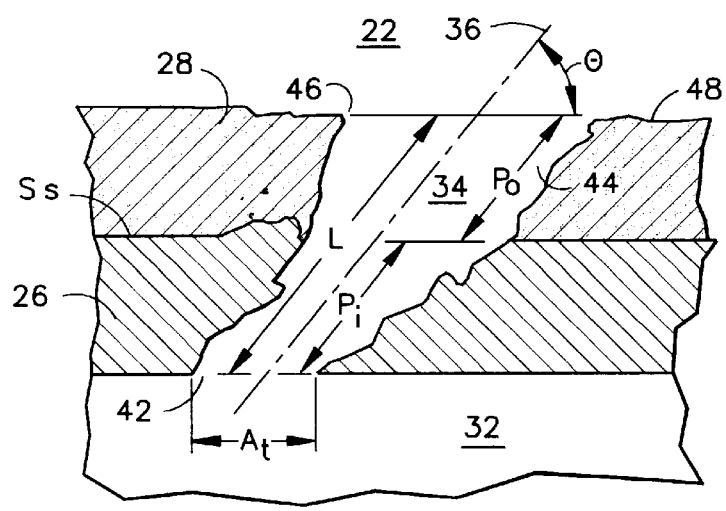
FIG. 2 is an enlarged cross sectional view taken essentially in the direction 2—2 of FIG. 1 and illustrating the blade substrate material, an existing protective coating applied to the substrate and a typical transpiration cooling passage extending through the substrate and the coating.

Referring to FIGS. 1 and 2, a turbine blade 12 for a gas turbine engine comprises a root 14, a platform 16 and an airfoil 18. When installed in an engine, the blade platform cooperates with the platforms of adjacent blades to define the radially inner boundary of an annular gaspath 22, and the airfoil extends radially outwardly across the gaspath. During engine operation, the airfoil 18 and platform 16 are exposed to hot, corrosive combustion gases flowing through the gaspath. To ensure that the blades can withstand such a hostile environment, they are typically made of a heat tolerant, corrosion resistant substrate material 26. Commonly used substrates include nickel base alloys (usually including significant quantities of chromium, cobalt, aluminum, tantalum and tungsten) and cobalt base alloys (usually having significant quantities of chromium, nickel and tungsten). In gas turbine engine applications, the most preferred nickel and cobalt base alloys are those having yield strengths in excess of 100,000 psi and 50,000 psi respectively at 1000° F. (537° C.). These are commonly referred to as "superalloys".

Protective coatings, such as metallic coating 28, are frequently applied to the external substrate surface $S_s$ to provide additional resistance to corrosion and temperature related distress. One exemplary class of coatings is the class of MCrAlY coatings. MCrAlY coatings contain nickel and/or cobalt (the nickel and/or cobalt content being signified by the letter "M") along with significant amounts of chromium (Cr), aluminum (Al) and yttrium (Y). Some typically employed MCrAlY coatings are described in U.S. Pat. Nos. 3,928,026, 4,585,481 and RE-32121. Such coatings not only augment the corrosion and heat resistant properties of the substrate, but may also serve as a foundation for an optional, ceramic thermal barrier coating, not shown. It is desirable to apply the MCrAlY coating by a plasma spray process since plasma spraying is relatively inexpensive in comparison to other techniques, such as vapor deposition.

Further thermal protection is often provided by flowing a cooling medium through a variety of cavities and passages in the blade. The illustrated blade includes one or more internal cavities, such as representative cavity 32, and a plurality of transpiration cooling passages, such as substantially frustoconical passage 34, each in flow communication with the cavity 32. As seen best in FIG. 2, a typical transpiration passage has an axis 36 and extends through both the substrate 26 and the metallic coating 28 (as well as through any other coating layers that may have been applied over the metallic coating). The substrate 26 is exposed and peripherally bounds the passage over an inner portion $P_i$ of its length L that extends axially from the cavity 32 to the substrate surface $S_s$. An outer portion $P_o$ of the passage length extends axially from the substrate surface $S_s$ to gaspath exposed surface 48. The passage has a throat 42, whose area $A_t$ is the minimum flow area of the passage and therefore regulates the quantity of cooling medium entering the passage. The illustrated passage also has an axially diverging, and therefore nonregulatory mouth 44 that extends from the throat to an outlet 46 at the gaspath exposed surface 48. During engine operation, the cooling medium is directed into the cavity. At least a portion of the medium flows outwardly through the transpiration passages to transpiration cool the blade, and the medium discharges into the gaspath 22. Because the passage axis 36 is inclined at an angle θ relative to surface 48, the discharged medium disperses over the exposed surface 48 to form a cooling film.

Figure 3:
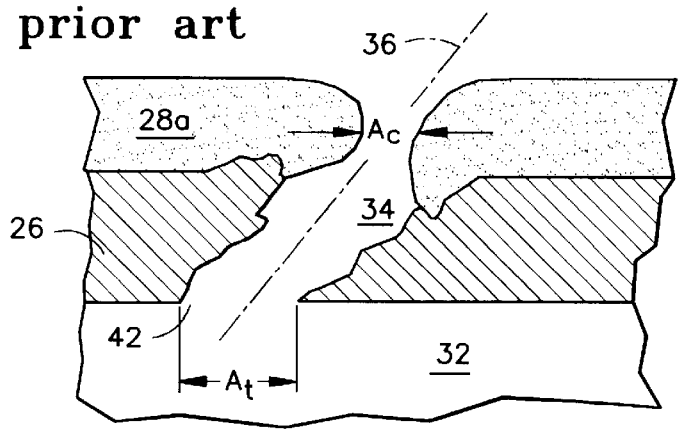
FIG. 3 is a view similar to that of FIG. 2 after the existing protective coating has been stripped and a nonoriginal layer of coating has been applied according to a prior art method.

FIG. 3 shows the blade of FIG. 2 subsequent to stripping of the existing original coating 28 and application of a nonoriginal coating 28a by plasma spraying. A quantity of excess coating has accumulated in the mouth of the hole so that area $A_c$, rather than area $A_t$, is the minimum area of the passage. As a result, the quantity of cooling medium flowing through the passage is regulated by the constricted area $A_c$, and not by the area $A_t$ as desired. Since this "coatdown" phenomenon affects most, if not all of the transpiration cooling passages, the effectiveness of the cooling medium is diminished and blade's durability is compromised. The coatdown phenomenon is normally not a problem during the manufacture of original equipment blades since the protective coatings are usually applied prior to the installation of the cooling passages.

Figure 4:
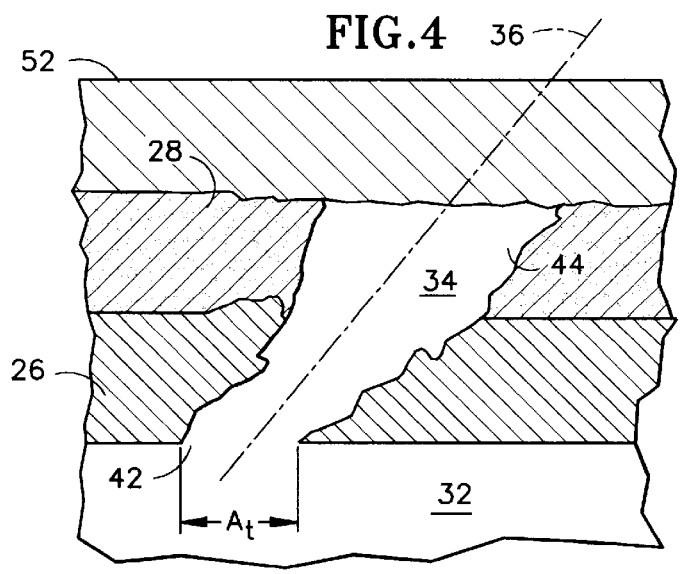
FIG. 4 is a view similar to that of FIG. 2 showing a layer of auxiliary coating in the form of an adherable coating tape applied to the existing coating.

Referring now to FIGS. 4–7, the method of the present invention, as applied to a blade having an MCrAlY coating, is described in detail. The airfoil being refurbished is first cleaned with a shower of abrasive grits directed against the blade by a stream of high pressure air. This grit blasting process removes any loose dirt, any ceramic thermal barrier coating that may have been present on the existing metallic coating 28, and some of the metallic coating, primarily the corroded portions thereof. A layer of auxiliary coating 52 is then deposited over the existing metallic coating 28 as seen in FIG. 4. The auxiliary coating is one that is diffusible into the substrate 26 and preferably into the existing coating 28 as well. The auxiliary coating may be in any suitable form and deposited by any applicable method. A particularly convenient form is an adherable tape, known as CAI-201M tape, comprising aluminum and manufactured by Coating Applications Inc. of Cincinnati Ohio. The tape is manually pressed into place so that it adheres to the existing coating. Another example of a suitable coating is a pack process deposited powder comprising, by weight, approximately 1.8% silicon, 2.5% ammonium chloride, 13.2% aluminum and 82.5% aluminum oxide.

Figure 5:
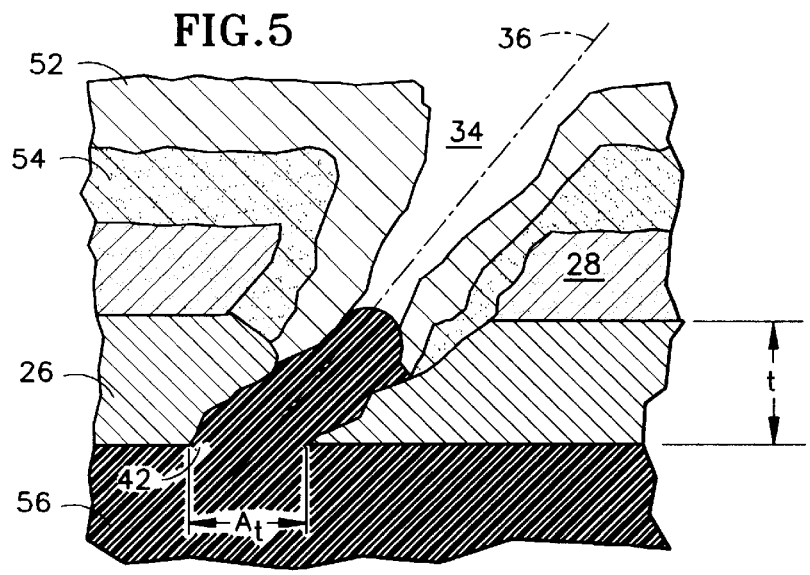
FIG. 5 is a view similar to that of FIG. 4 showing a diffusion zone resulting from diffusion of the auxiliary coating into the existing coating and into the substrate at the periphery of the mouth of the passage.

The turbine blade is then placed in a nonoxidizing atmosphere (e.g. argon) at an absolute pressure of about 14 to 25 pounds per square inch and elevated to a temperature of approximately 1975° F. (1080° C.) for approximately four hours. This thermal treatment relieves any residual stresses in the blade and softens the tape allowing it to settle into the passage mouth. As seen in FIG. 5, the thermal treatment also diffuses the coating tape into the exposed substrate 26 at the periphery of the passage, and preferably into the existing coating 28 as well, to form a diffusion zone 54. In the preferred embodiment, the auxiliary coating is only partially diffused into the existing coating so that both undiffused auxiliary coating and undiffused existing coating are present after the diffusion step is complete. The presence of the undiffused coatings is acceptable since the preferred stripping agent is capable of attacking the undiffused coatings as well as the diffusion zone. Moreover, any attempt to completely diffuse the auxiliary coating into the existing coating introduces the risk of diffusing the auxiliary coating into the substrate material beneath the existing coating as well as into the exposed substrate at the periphery of the cooling passage. Subsequent stripping of the diffusion zone would then reduce the wall thickness t of the airfoil—an undesirable occurrence since the airfoil is highly stressed during engine operation. Likewise, the diffusion zone does not extend to the passage throat 42 since it is desired that the throat area $A_t$ be unaffected by subsequent stripping of the diffusion zone.

Diffusion of the auxiliary coating into the existing MCrAlY coating, not just into the exposed substrate, is advantageous since the MCrAlY coating tends to become depleted of its aluminum content during engine operation. The diffusion of the auxiliary coating into the MCrAlY coating replenishes the aluminum content of the MCrAlY coating, and this re-aluminizing of the MCrAlY coating makes it more readily removable during the subsequent stripping step. Nevertheless, the desired enlargement of the passage mouth requires only that the auxiliary coating be diffused into the exposed substrate at the periphery of the passage mouth.

Since the blade will be subjected to the action of a stripping agent, the thermal treatment is followed by the application of a removable protective mask to those parts of the blade that are to be shielded from the agent. These portions typically include the root 14, the internal cavities 32 and at least a portion of each cooling passage in the vicinity of the passage throat 42. Any masking material or combination of materials capable of resisting the action of the stripping agent (e.g. various waxes and plastics) is suitable. An injectable masking material 56 is used for masking the internal cavities and the cooling passages.

The masked blade is then subjected to a stripping agent, usually by immersing the entire blade in a bath of the agent. The agent strips the diffusion zone 54, any undiffused auxiliary coating 52 and any undiffused existing coating 28 from the substrate. Hydrochloric acid (HCl) has been found to be an effective stripping agent against the existing MCrAlY coating, the CAI-201M aluminum auxiliary coating and the diffusion zone. However any agent capable of attacking the existing coating, the auxiliary coating and the diffusion zone is suitable.

Figure 6:
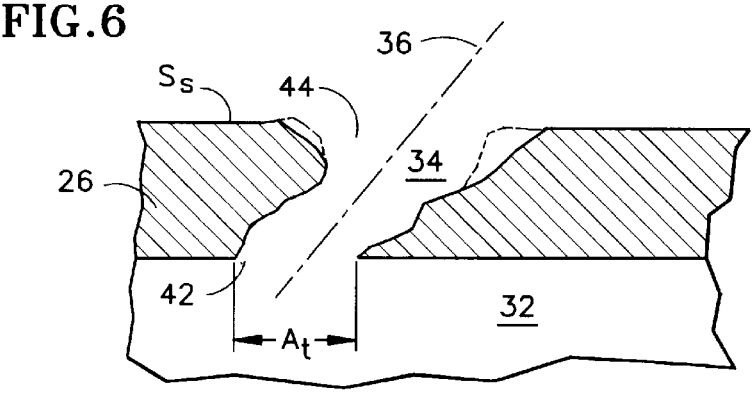
FIG. 6 is a view similar to that of FIG. 5 but subsequent to stripping of the diffusion zone, the existing coating and the auxiliary coating, and showing a compensatory enlargement of the mouth of the passage.
Figure 7:
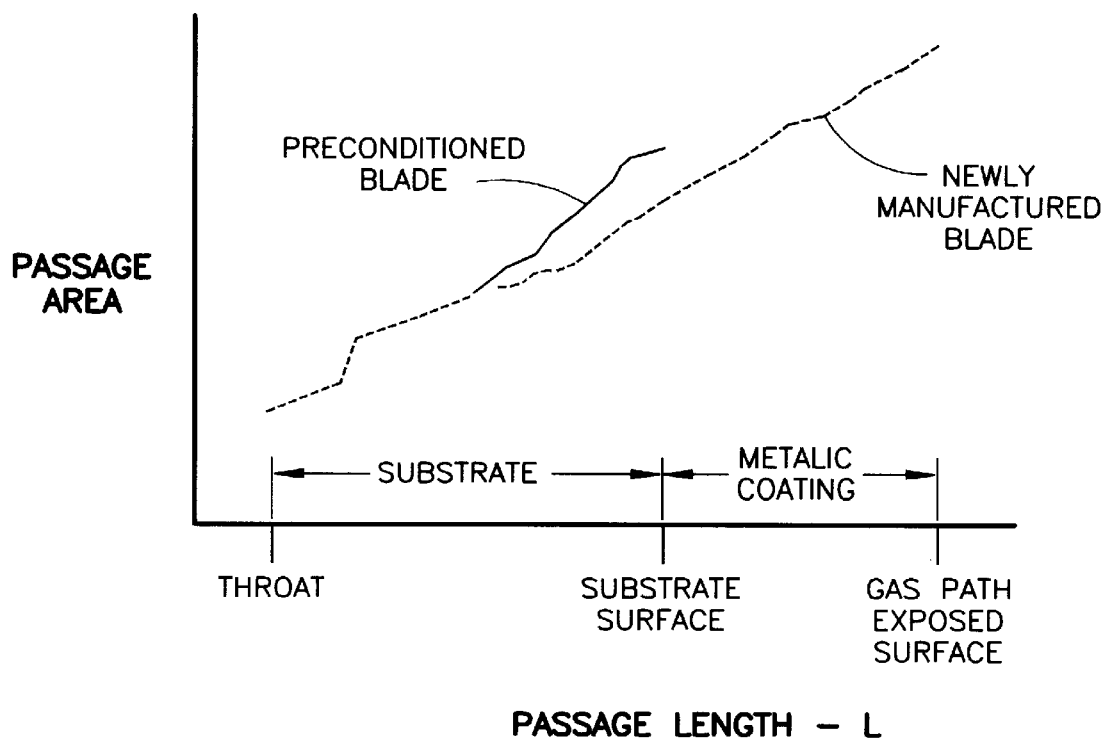
FIG. 7 is a schematic graphical comparison showing the flow area of a cooling passage in a newly manufactured gas turbine engine blade and the flow area of a cooling passage in a blade preconditioned in accordance with the invention.

FIG. 6 illustrates the blade after the stripping agent has attacked and removed the diffusion zone. Because the diffused substrate/auxiliary coating (represented in phantom in the Figure) has been stripped from the blade, the mouth of the passage has been enlarged without affecting the throat area $A_t$. Stated more rigorously, and as shown graphically in FIG. 7, the passage has a preconditioned state (FIG. 6) in which the average rate of change of passage area from the throat to the external substrate surface $S_s$ is greater than the average rate of change of passage area in the passage's newly installed state (FIG. 2 or the phantom portion of FIG. 6). In effect, the stripping method of the present invention preconditions the blade so that the regulatory character of the passage throat and the flow capacity of the passage will not be degraded by subsequent recoating.

Figure 8:
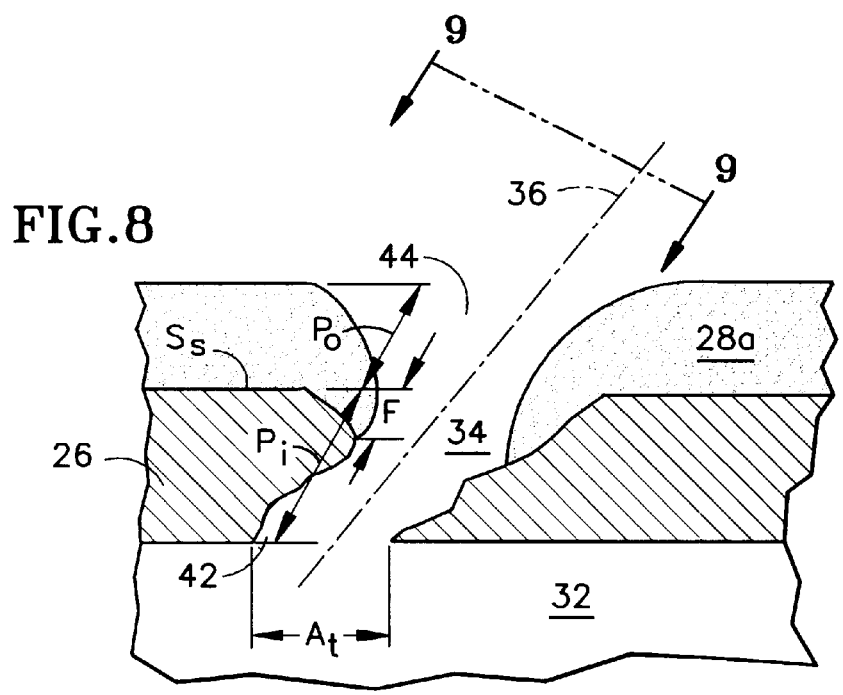
FIG. 8 is a view similar to that of FIG. 6 subsequent to the application of a nonoriginal layer of coating.

FIG. 8 illustrates the blade of FIG. 6 in its fully refurbished state, i.e. subsequent to the application of a nonoriginal layer of coating 28a in lieu of the original coating. Excess coating has accumulated in the mouth of the passage so that passage inner portion $P_i$, which extends from cavity 32 to the substrate surface $S_s$, is peripherally bounded by nonoriginal coating 28a over a fraction F of the length of the inner portion. The coatdown evident in FIG. 8 is similar to that observed when the original coating is stripped according to conventional methods (FIG. 3). However due to the compensatory enlargement of the passage mouth, the accumulated coating does not regulate the flow capacity of the passage. Instead, the area $A_t$ of the throat 42 retains its regulatory role despite the presence of coating 28a axially overlaying the substrate 26 along fraction F of passage inner portion $P_i$. As a result, the flow capacity of the passage is undiminished by the nonoriginal coating, or at least is not diminished below a predetermined minimum acceptable flow capacity. In contrast to the prior art, this result is achieved with the coating as initially applied to the blade, i.e. without the need to abrasively erode or otherwise operate on the accumulated coating subsequent to the coating being deposited on the blade. In practice, it may be acceptable for the flow capacity of one or more passages to be slightly diminished as long as the aggregate flow capacity of all the passages remains at least as great as a predefined aggregate flow capacity for all the passages.

The above described stripping method circumvents the inaccuracies inherent in erosively abrading excess coating from the passage mouths. As a result, it may be possible to dispense with the tedious, time consuming pin check of each individual passage and rely instead on a simple, aggregate flow capacity check of the article as a whole.

Figure 9:
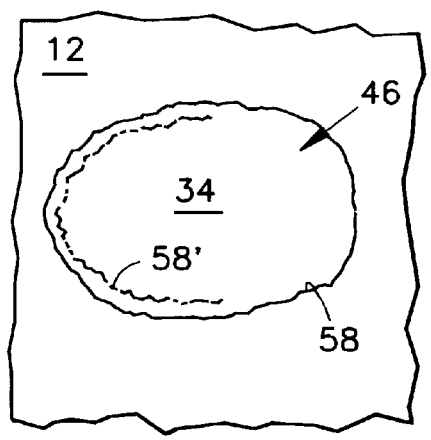
FIG. 9 is a view taken essentially in the direction 9—9 of FIG. 8 showing the outlet edges of a cooling passage in an article treated according to the present invention in comparison to the outlet edges in an original article or a conventionally treated article.

Referring to FIG. 9, the edge 58 of each passage outlet 46 is smoother and somewhat wider than the outlet edge 58' of either an abrasively eroded passages or a passage installed in a newly manufactured blade. Newly installed passages are typically laser drilled, resulting in molten substrate material being expelled from the site at which the laser beam strikes the blade. Some of the molten substrate collects in the passage mouth near the outlet. As a result, the outlet edge 58' of a newly installed passage is irregular and slightly constricted, although not constricted enough to regulate the flow capacity of the passage. Neither the irregularities nor the constriction are affected by the prior art stripping method. By contrast, the disclosed stripping method removes the collected substrate material thereby smoothing and widening the edge of the outlet. As a result, the refurbished article may benefit from improved dispersion of the cooling film.

Various changes and modifications can be made without departing from the invention as set forth in the accompanying claims. For example the method is applicable to apertured articles other than transpiration cooled gas turbine engine blades and vanes. Moreover, although the invention was presented in the context of an article comprised of a nickel base alloy with an MCrAlY coating, the invention is equally applicable to articles comprised of other substrates, such as cobalt and iron base alloys, in combination with other types of coatings. Finally, the invention is not limited to articles having passages with a frustoconical profile. The invention is equally applicable to passages having a substantially cylindrical profile as well as those having multi-geometry profiles such as the shaped holes described in U.S. Pat. No. 4,653,983 to Vehr et al.

We claim:

1. An article preconditioned to accept a protective coating, the article comprised of a substrate material and having at least one fluid flow passage extending from an internal cavity to a substrate surface of the article, the passage having an axis, a throat with a regulatory flow area and a mouth extending from the throat to the substrate surface, the mouth having a nonregulatory flow area, the nonregulatory flow area being at least as large as the regulatory flow area, the passage having a newly installed state and a preconditioned state, the average rate of change of passage area from the throat to the substrate surface in the preconditioned state being greater than the average rate of change of passage area in the newly installed state and the regulatory flow area in the preconditioned state being substantially the same as the regulatory flow area in the newly installed state.

2. An apertured article with a nonoriginal protective coating applied thereto, the article comprised of a substrate material, and having an internal cavity;

the article having an original state with an original coating applied to an external surface of the substrate, and wherein one or more cooling passages extend through the substrate and the original coating, each passage having an axis, a passage inner portion extending axially from the cavity to the substrate surface and being peripherally bounded by the substrate material, and a passage outer portion extending axially from the substrate surface to a gaspath exposed surface of the coating and being peripherally bounded by the coating, each passage also having a throat that establishes a flow capacity for the passage;

the article also having a refurbished state with the nonoriginal coating applied to the external surface in lieu of the original coating, the nonoriginal coating axially overlaying the substrate along a fraction of the inner portion, the flow capacity of each passage being substantially undiminished by the presence of the nonoriginal coating.

3. An apertured article with a nonoriginal coating applied thereto, the article comprised of a substrate material, and having an internal cavity;

the article having an original state with an original coating applied to an external surface of the substrate, and wherein one or more cooling passages extend through the substrate and the original coating, each passage having an axis, a passage inner portion extending axially from the cavity to the substrate surface and being peripherally bounded by the substrate material, and a passage outer portion extending axially from the substrate surface to a gaspath exposed surface of the coating and being peripherally bounded by the coating, each passage also having a throat that establishes a flow capacity for the article;

the article also having a refurbished state with the nonoriginal coating applied to the external surface in lieu of the original coating, the nonoriginal coating axially overlaying the substrate along a fraction of the inner portion of at least some of the passages, the aggregate flow capacity being substantially undiminished by the presence of the nonoriginal coating.

\* \* \* \* \*